(12) United States Patent
Pelly et al.

(10) Patent No.: US 7,899,205 B2
(45) Date of Patent: Mar. 1, 2011

(54) DATA CONTENT IDENTIFICATION

(75) Inventors: Jason Charles Pelly, Reading (GB);
Daniel Warren Tapson, Basingstoke (GB); Mark Julian Russell, Maidenhead (GB)

(73) Assignee: Sony United Kingdom Limited, Weybridge (GB)

( * ) Notice: Subject to any disclaimer, the term of this patent is extended or adjusted under 35 U.S.C. 154(b) by 1948 days.

(21) Appl. No.: 10/896,251

(22) Filed: Jul. 21, 2004

(65) Prior Publication Data
US 2005/0021568 A1 Jan. 27, 2005

(30) Foreign Application Priority Data
Jul. 23, 2003 (GB) .................. 0317247.5

(51) Int. Cl.
*G06K 9/00* (2006.01)
(52) U.S. Cl. .................. 382/100; 713/176; 713/177; 713/178; 713/179; 713/180; 705/57; 705/58; 380/201; 380/202; 380/203; 380/204; 358/3.28
(58) Field of Classification Search .................. 382/100; 707/200; 358/3.28; 705/58, 57; 713/176, 713/177–180; 380/201–204
See application file for complete search history.

(56) References Cited

U.S. PATENT DOCUMENTS

| | | | |
|---|---|---|---|
| 5,664,018 A | 9/1997 | Leighton | |
| 6,108,434 A * | 8/2000 | Cox et al. | 382/100 |
| 6,285,774 B1 | 9/2001 | Schumann et al. | |
| 6,373,974 B2 * | 4/2002 | Zeng | 382/135 |
| 6,915,481 B1 * | 7/2005 | Tewfik et al. | 715/202 |
| 6,983,056 B1 * | 1/2006 | Amano | 382/100 |
| 7,031,491 B1 * | 4/2006 | Donescu et al. | 382/100 |

(Continued)

FOREIGN PATENT DOCUMENTS

EP 1 324 262 7/2003

(Continued)

OTHER PUBLICATIONS

Qibin Sun et al: "A secure and robust approach to scalable video authentication" Multimedia and Expo, 2003. Proceedings. 2003 International Conference on Jul. 6-9, 2003, Piscataway, NJ, USA,IEEE, vol. 2, Jul. 6, 2003, pp. 209-212, XP010650697 ISBN:0-7803-7965-9.

*Primary Examiner*—Brian Q Le
*Assistant Examiner*—Eric Rush
(74) *Attorney, Agent, or Firm*—Oblon, Spivak, McClelland, Maier & Neustadt, L.L.P.

(57) ABSTRACT

A method of detecting a version of input data content, there being a plurality of different versions of said data content, in which:
said data content is arranged as two or more segments according to a segmentation pattern; and
said versions of said data content are identifiable by corresponding identification data patterns by which at least some of said segments have respective identification data;
said method comprising the steps of:
(i) detecting said identification data in respect of said segments of said input data content;
(ii) comparing said detected identification data with said identification data patterns corresponding to said different versions of said data content; and
(iii) detecting that said input data content comprises at least a contribution from a certain version of said data content if a sum of matches obtained between said detected identification data and said identification data pattern for said certain version exceeds a threshold number.

16 Claims, 7 Drawing Sheets

U.S. PATENT DOCUMENTS

| | | | |
|---|---|---|---|
| 7,068,823 B2 * | 6/2006 | Malik et al. | 382/124 |
| 7,206,430 B2 * | 4/2007 | Pelly et al. | 382/100 |
| 7,398,395 B2 * | 7/2008 | Epstein | 713/176 |
| 2002/0120849 A1 | 8/2002 | McKinley et al. | |
| 2003/0039376 A1 * | 2/2003 | Stach | 382/100 |
| 2003/0187679 A1 * | 10/2003 | Odgers et al. | 705/1 |
| 2003/0190054 A1 * | 10/2003 | Troyansky et al. | 382/100 |

FOREIGN PATENT DOCUMENTS

| | | |
|---|---|---|
| GB | 2 383 221 | 6/2003 |
| GB | 2 386 279 | 9/2003 |
| WO | WO 99/65241 | 12/1999 |
| WO | WO 2005/003887 A2 | 1/2005 |

\* cited by examiner

DATA CONTENT IDENTIFICATION

BACKGROUND OF THE INVENTION

1. Field of the Invention

This invention relates to data content identification. Examples of such content include one or more of video content, audio content, metadata content, text content, image content and so on, such as audio visual content.

2. Description of the Prior Art

The growth of new digital infrastructures, including digital devices and high-speed networks, combined with increasing processor power, is making content creation, manipulation and distribution both simpler and faster. While this greatly aids legitimate usage of the content, a disadvantage is that unauthorised abuse or "piracy" of such content (particularly copyright content), such as unauthorised reproduction or distribution, is also becoming easier and more damaging to the content owner.

The situation is made more complicated in that commercial considerations may require the content owner to allow a potential customer to see or use the content in a trial situation—perhaps as part of a professional review of the content or before committing to purchase rights to use the content from the owner. In the case of, for example, a movie film, very many copies of the content may be distributed in this way.

It has been proposed that a so-called "fingerprinting" technique is used to apply identification data to the content. While this does not prevent unauthorised copying, it can allow the source of the unauthorised copies to be detected. Examples of a fingerprinting technique applicable to video signals are described in GB-A-2383221 and U.S. Pat. No. 5,664,018.

However, this technique can take a long time to carry out. Using current technology at the priority date of this application, it can take up to, say, ten hours to apply the fingerprint processing to a full length movie film.

SUMMARY OF THE INVENTION

This invention provides a method of detecting a version of input data content, there being a plurality of different versions of said data content, in which:

said data content is arranged as two or more segments according to a segmentation pattern; and said versions of said data content are identifiable by corresponding identification data patterns by which at least some of said segments have respective identification data;

said method comprising the steps of:

(i) detecting said identification data in respect of said segments of said input data content;

(ii) comparing said detected identification data with said identification data patterns corresponding to said different versions of said data content; and (iii) detecting that said input data content comprises at least a contribution from a certain version of said data content if a sum of matches obtained between said detected identification data and said identification data pattern for said certain version exceeds a threshold number.

The invention builds upon an unpublished proposal to generate fingerprinted content by combining sections or "segments" of multiple master copies of the content, at least some of which carry fingerprint data. (Here the term "fingerprint" refers to the secure addition of identification data to content, ideally in such a way that its presence is substantially imperceptible to the user). The segments are combined in accordance with a segmentation pattern which may be unique or quasi-unique to a particular user of that copy of the content.

An advantage of this unpublished proposal is that uniquely fingerprinted copies of the content can be generated in a much shorter time than the time which would be required to apply the full fingerprint processing to each individual copy.

If a suspected pirate copy of the content is discovered, it is useful to be able to identify the source of the content from which the pirate version was copied. This can identify either the producer of the pirate copy or a security lapse by a user which allowed pirate copies to be made by another. In the unpublished proposal, this would require the detection of a 100% match between the fingerprint data detected in respect of each segment and the fingerprint data known to have been used for each segment in the version issued to a user.

However, this basic detection technique would take no account of a failure to detect a fingerprint in respect of one or more fingerprinted segments. Such a failure could occur if the content has been the subject of certain processing, such as so-called "camcorder piracy" in the case of a movie film. Nor does this basic detection technique take any account of so-called "collusion attacks", in which pirate copies are made as a combination of multiple legitimate copies, in an attempt to remove or dilute the fingerprint data.

The invention addresses at least some of these problems by providing a thresholding of the sum of matches between detected identification data and the identification data pattern for a user's version, in order to detect that the user's version is a source of the unauthorised copy.

In order to be assured of a desired false positive detection rate, especially in the case of a so-called collusion attack where individual segments may yield plural identification data, it is preferred to derive the threshold number from the identification data detected in respect of segments of the input data content. In particular, it is preferred that the threshold number depends upon how many instances of identification data are detected in respect of each segment of the input data content. Preferably the threshold number is set so that the statistical chance of the input data content being incorrectly detected as a certain version, given the number of instances of identification data detected in respect of each segment of the input data content, is less than a threshold probability.

In an alternative/additional technique, it is preferred that the method comprises weighting a match between identification data detected in respect of a segment of the input data content according to the number of instances of identification data detected in respect of that segment of the input data content, the sum of matches being a weighted sum of matches.

It is expected that a more reliable result would be obtained where the weighting is such that a segment for which plural instances of identification data are detected contributes less to the detection of a particular version than a segment for which a single instance of identification data is detected. However, counter-intuitively, it has been detected in some empirical tests of prototypes that a better result can be obtained where the weighting is such that a segment for which plural instances of identification data are detected contributes more to the detection of a particular version than a segment for which a single instance of identification data is detected.

To alleviate the problem of some segments not yielding identification data, it is preferred that if identification data is not detected in respect of two or more segments of the input data content, those segments are combined into groups of two or more segments and identification data detected in respect of the combined groups of segments. This process can preferably be repeated iteratively.

Preferably the threshold number represents a number of segments less than the total number of segments, and/or a number of segments less than the total number of segments having associated identification data in that identification data pattern.

Although identification patterns in which only some segments carry identification data can be used, it is preferred that versions of the data content are identifiable by corresponding identification patterns by which substantially all of the segments have respective identification data.

This invention also provides a method of applying identification data to input data content, said method comprising the steps of:

(i) generating n instances of said input data content, where n is greater than one, at least all but one of said instances carrying respective identification data, said identification data of each of said instances carrying respective identification data being unique with respect to said respective identification data carried by the others of said instances; and (ii) generating versions of said input data content by selecting segments from said n instances, so that each of said versions of said input data content carries identification data from said instances in accordance with an associated identification data pattern;

followed by one or more iterations of the steps of:

(iii) generating m further instances of said input data content, where m is one or more, each of said m instances carrying respective identification data which is unique with respect to all of the others of said instances; and (iv) generating further versions of said input data content by selecting segments from said m instances, a set of said instances including said m instances, or all of said generated instances, so that each version of said input data content carries identification data from said instances in accordance with an associated identification data pattern.

For better detection of the origin of pirate copies, it is preferred that in step (i), all of the instances carry respective identification data which is unique with respect to the other instances.

This invention also provides a method of applying identification data to input data content, said method comprising the steps of:

(i) providing n instances of said input data content, where n is greater than one, at least all but one of said instances carrying respective identification data, said identification data of each of said instances carrying respective identification data being unique with respect to said respective identification data carried by the others of said instances; and (ii) generating versions of said input data content by selecting segments by a predetermined segmentation pattern from said n instances, so that each of said versions of said input data content carries identification data from said instances in accordance with an associated identification data pattern;

in which said segmentation pattern is such that at least one of said segments is not contiguous within said input data content.

This aspect of the invention can provide advantages in avoiding so-called collusion attacks, in which multiple copies of fingerprinted data are combined. By using non-contiguous segments it will be harder for a group of colluders to identify the segment boundaries.

The invention is particularly well suited to data content comprising video content having a plurality of successive images. Preferably the identification data is encoded within the data representing at least some of the images, for example within a subset of spatial frequency components of at least some of the images.

This invention also provides apparatus for detecting a version of input data content, there being a plurality of different versions of said data content, in which:

said data content is arranged as two or more segments according to a segmentation pattern; and said versions of said data content are identifiable by corresponding identification data patterns by which at least some of said segments have respective identification data;

said apparatus comprising:

an identification data detector operable to detect identification data in respect of said segments of said input data content;

a comparator operable to compare said detected identification data with said identification data patterns corresponding to said different versions of said data content; and a contribution detector operable to detect that said input data content comprises at least a contribution from a certain version of said data content if a sum of matches obtained between said detected identification data and said identification data pattern for said certain version exceeds a threshold number.

This invention also provides apparatus for applying identification data to input data content, said apparatus comprising:

(i) an instance generator operable to generate n instances of said input data content, where n is greater than one, at least all but one of said instances carrying respective identification data, said identification data of each of said instances carrying respective identification data being unique with respect to said respective identification data carried by the others of said instances;

(ii) a version generator operable to generate versions of said input data content by selecting segments from said n instances, so that each of said versions of said input data content carries identification data from said instances in accordance with an associated identification data pattern;

(iii) an instance generator controller operable to control said instance generator to generate m further instances of said input data content, where m is one or more, each of said m further instances carrying respective identification data which is unique with respect to all of the others of said instances; and (iv) a version generator controller operable to control said version generator to generate further versions of said input data content by selecting segments from said m instances, a set of said instances including said m instances, or all of said generated instances, so that each of said versions of said input data content carries identification data from said instances in accordance with an associated identification data pattern.

This invention also provides apparatus for applying identification data to input data content, said apparatus comprising:

(i) a provider operable to provide n instances of said input data content, where n is greater than one, at least all but one of said instances carrying respective identification data, said identification data of each of said instances carrying respective identification data being unique with respect to said respective identification data carried by the others of said instances; and (ii) a version generator operable to generate versions of said input data content by selecting segments by a predetermined segmentation pattern from said n instances, so that each of said versions of said input data content carries identification data from said instances in accordance with an associated identification data pattern;

in which said segmentation pattern is such that at least one of said segments is not contiguous within said input data content.

Further respective aspects and features of the invention are defined in the appended claims.

BRIEF DESCRIPTION OF THE DRAWINGS

The above and other objects, features and advantages of the invention will be apparent from the following detailed description of illustrative embodiments which is to be read in connection with the accompanying drawings, in which.

DESCRIPTION OF THE PREFERRED EMBODIMENTS

The present technique may be used to mark content so as to be able to uniquely identify the content (or a copy of at least part of the content) later using forensic analysis. The concept is applicable to any packetisable data such as video and audio elementary data or multiplexed streams. This does not mean to say that the data must be in a formal packetised form, but rather that the data can be manipulated as segments or portions representing subsets of the whole amount of data to be marked. The technique can be applied to packaged media (such as content stored on a storage medium such as an optical disk), content downloaded from the Internet (so-called content "pull" system), content broadcast over, for example, a digital television service (so-called content "push" system), or other content delivery formats.

The process of creating fingerprinted content involves creating two or more (in general, m) master copies $M_i$. The individual masters can all be marked uniquely using fingerprinting or one original can be left unmarked. In the case of video content, the techniques described in the above references allow identification data to be added to the content in such a way that the presence of the identification data is substantially imperceptible to the viewer, the identification data may be decoded later from a short section of the content (of the order of perhaps a few seconds of video) and the identification data is substantially robust against manipulation of the content such as resizing, data compression or even camcorder piracy (capturing the content by directing a video camera at a screen showing the content).

Then the masters are divided up identically into n number of parts (segments or portions).

In a basic system, the division is a simple time-division so that segment 1 comprises a first time period of the content, segment 2 follows segment 1, segment 3 follows segment 2, and so on. The segments may be of equal length or may be of different lengths.

In a more advanced arrangement, each segment can potentially occupy a number of non-contiguous time periods. This arrangement has advantages in resisting so-called collusion attacks, and will be described further below with reference to FIG. 4.

In a further possibility (which may be combined with either of the two possibilities described above), the segments can be arranged as spatial divisions of video content, so that, for example, an upper part of the picture may represent a different segment to a lower part of the picture.

Based on a pseudo-random generation of combinations of the n segments from the m masters, a version of the content is created which contains the same n segments, but the identification data applied to those segments is combined in a pseudo-random manner. As long as a sufficient number of masters and segments is used to provide a set of permutations sufficiently large to encompass the number of versions to be distributed, no two versions need ever have the same permutation of segment identification data. This means that each version has a unique fingerprint, without the need to apply the time consuming process of bespoke fingerprint generation to produce each such version.

Figure 1:
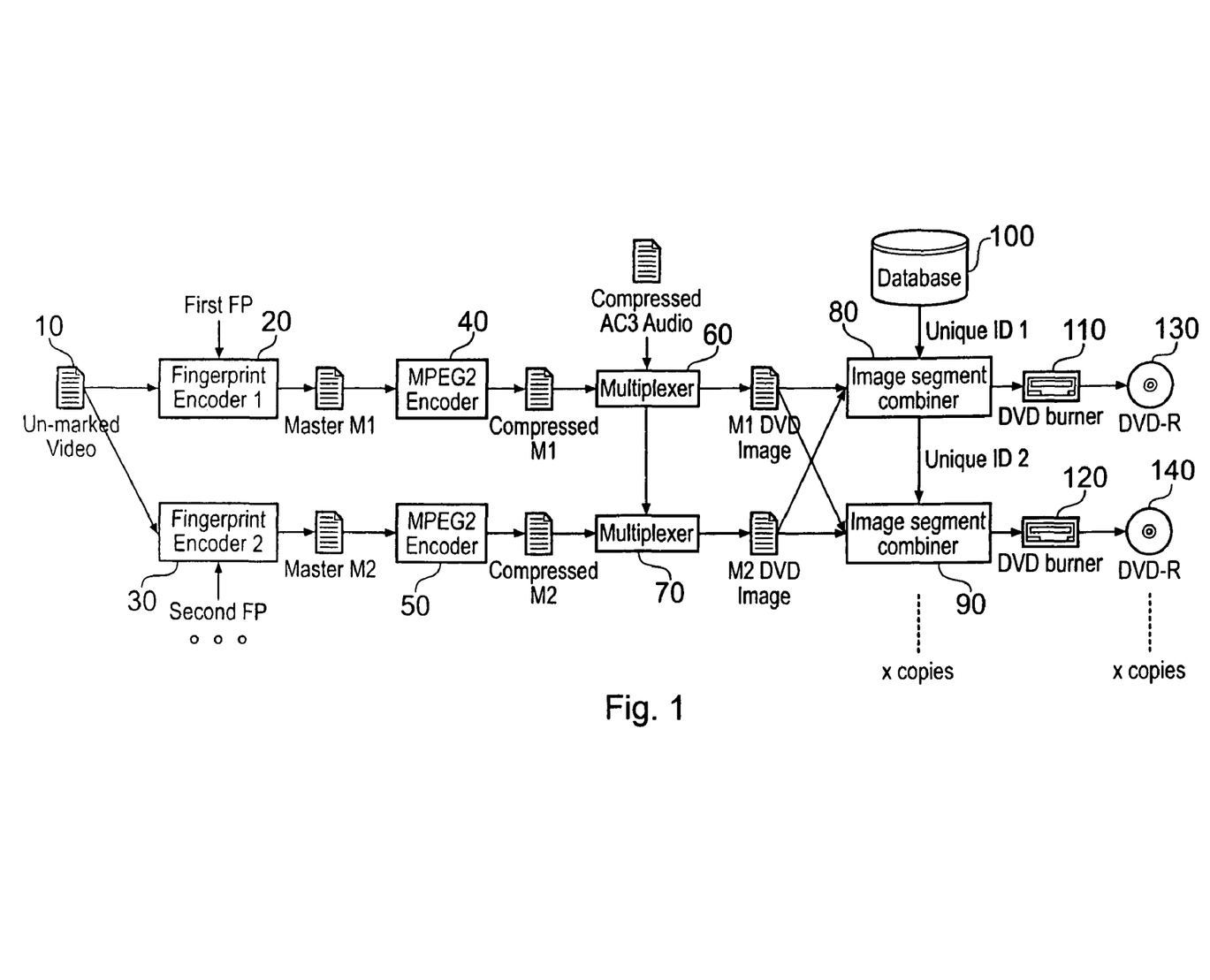
FIG. 1 is a schematic diagram of a fingerprint encoding apparatus.

FIG. 1 is a schematic diagram of a fingerprint encoding apparatus using this technique.

In FIG. 1, an unmarked (not fingerprinted) video file 10 is supplied to two fingerprint encoders 20, 30. The video is subject to fingerprint encoding using two different sets of fingerprint data to produce two masters $M_1$, $M_2$. It will be appreciated that one of the masters might in fact be left un-fingerprinted, and it will also be appreciated that the fingerprint encoding process could be carried out as a serial process rather than the parallel one shown in FIG. 1. Furthermore, the number of masters could be greater than two.

The two masters are subjected to MPEG2 encoding by encoders 40, 50 and compressed audio data such as AC3 audio data is multiplexed into the data by multiplexers 60, 70. This produces two so-called DVD images, that is to say the video data in a form ready to be recorded onto a DVD disk. Each image contains the fingerprint corresponding to the master $M_1$ or the master $M_2$.

Two image segment combiners 80, 90, which receive identification vectors from a user database 100, combine segments of the two master DVD images $M_1$, $M_2$ according to the identification vectors. The identification vectors are considered to be unique (or at least quasi-unique) by arranging that the number of masters and the number of segment alterations gives a sufficiently large population of identification vectors for the number of versions required to be produced. The output of each combiner is supplied to a respective DVD writer (a so-called "burner") 110, 120 and respective DVD disks 130, 140 are written. To produce a further DVD disk from each burner, a new identification vector is supplied from the database and a new combination of the segments of the two master DVD images $M_1$, $M_2$ is produced.

Although FIG. 1 shows the same number of masters, combiners and burners (i.e. two of each), it will be appreciated that this is simply for clarity of the diagram. There is no technical reason why there should be the same number of combiners and burners as masters.

A non-secret code linking each disk to the (secret) identification vector stored in the database 100 may be written to the disk, printed visibly on the disk or both. This is not a technical feature but rather is useful for routing the disk to the correct user. Indeed, the name of the user could be stored in the database 100 and also printed onto the surface of the respective DVD disk.

Figure 2:
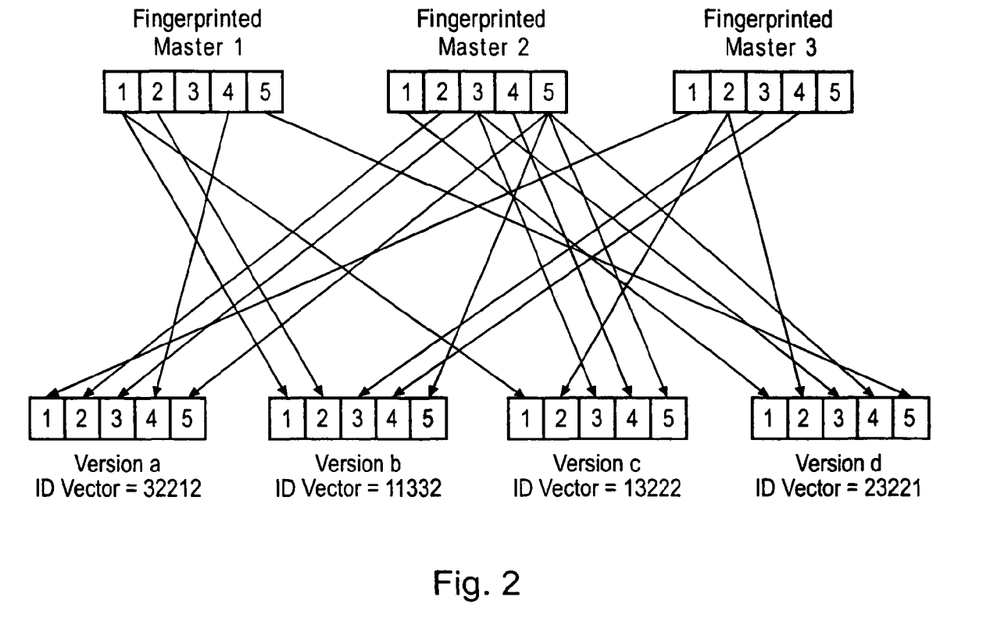
FIG. 2 schematically illustrates the generation of fingerprinted copies of content using segments of multiple master copies.

By way of an example, assume that there are 3 masters and each master is divided into 5 segments. This arrangement is schematically illustrated in FIG. 2. Each version would be defined by a five digit "identification vector" such as '13213' or '22131'. This indicates, in a pre-defined segment order, which master was used to provide each segment of that version. Referring to FIG. 2, the ID vectors used for the four example versions (a to d) at the lower part of the diagram are:

version a: 32212
version b: 11332
version c: 13222
version d: 23221

At replay, there should be no difference between versions in the audio/video material enjoyed by the user (assuming that the fingerprint data has been added in such a way as to be substantially imperceptible). The only difference between the versions is in the fingerprint data.

The identification vector can be stored in the database in such a way as to be linked to the user that received that version.

The possible combinations of individual fingerprints depends on 3 factors:

i) Number of masters m;

ii) Number of segments n;

iii) Maximum number of segments that can be interchanged k

The formula for determining the number of combinations (c) distinct from a single master is i) If all n segments are interchangeable then the number is $$c = m^n - 1$$

ii) If a maximum of k segments out of n are interchangeable then the number is $$c = \sum_{j=1}^{k} (m-1)^j {}_nC_j$$

For example, if 2(=m) masters for a 120 minute movie divided into 60(=n) segments are used, and only 20(=k) of the 60 segments are interchangeable, the number of combinations distinct from a single master is over $7 \times 10^{15}$. For a simpler set-up, assuming m=2, n=20 and all 20 are interchangeable the number of combinations distinct from a single master is 1,048,575. The following table demonstrates how the number of combinations distinct from a single master scales with the number of masters and number of segments.

| m | n | c |
|---|---|---|
| 2 | 20 | 1048575 |
| 3 | 20 | 3486784400 |
| 5 | 20 | 95367431640624 |
| 10 | 20 | 99999999999999999999 |
| 2 | 10 | 1023 |
| 2 | 20 | 1048575 |
| 2 | 60 | 1152921504606846975 |
| 2 | 99 | 633825300114114700748351602687 |

Figure 3:
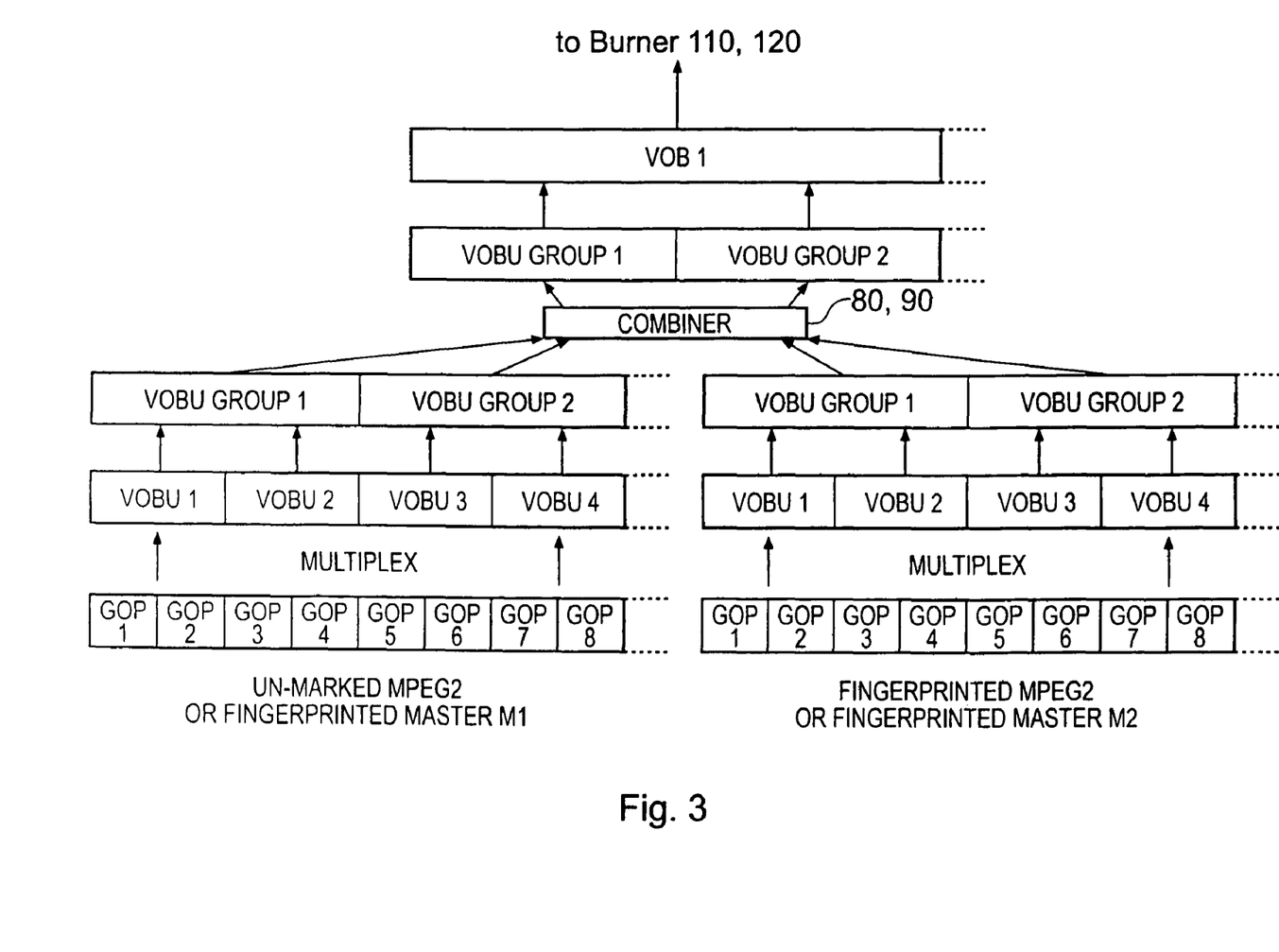
FIG. 3 schematically illustrates the application of the technique along VOBU boundaries in a DVD.

FIG. 3 schematically illustrates the application of the technique along VOBU boundaries in a DVD.

A VOBU (Video OBject Unit) is a small (typically a few seconds) contiguous sequence of video (and associated audio) stored on a DVD. It must include one or more self contained "Group of Pictures" (GOPs) which can be understood by the MPEG decoder of the DVD player. All seeking, jumping, etc on replay is guaranteed to occur at a VOBU boundary so that the decoder need not be restarted and that the location jumped to is always the start of a valid MPEG stream. VOBUs can be organised into VOBU Groups, which is turn can be arranged into VOBs (Video OBjects). Each VOBU Group is a standalone, multiplexed unit and does not have dependencies on previous or later units. A VOBU Group can have as many VOBUs as necessary or appropriate.

For simplicity of the diagram, FIG. 3 shows only two masters $M_1$ and $M_2$. These may be individually fingerprinted or one may be fingerprinted while the other is not. The two masters are MPEG2 encoded and pre-multiplexed into a VOBU and VOBU Group structure. The masters are segmented for the purposes of the present technique along VOBU group boundaries.

Then based upon a quasi-unique identification vector as described above, the segments are combined in a pseudo-random manner to recreate a unique DVD recording, which can then (for example) be burnt onto a recordable DVD (DVD-R). This process takes much less time than preparing a bespoke fingerprinted DVD-R, as the fingerprinting has to be done only to the masters which are then pre-multiplexed. The process of individualisation in respect of each version is simply concerned with concatenating data segments.

Once the VOBU groups are combined, then an IFO generation process takes place which calculates the offsets of each VOBU inside the newly created VOB. (In DVD video disk encoding, the IFO is a file stored on the DVD disk which contains InFOrmation. While the main component of the DVD is represented by the VOB files which contain MPEG-2-encoded audio, video and subtitle streams, the IFO files provide information for the DVD player as to where the DVD chapters start, where certain audio tracks are located, and the like.) To the DVD player the VOB appears to be fully self-consistent, as any properly-encoded DVD, but internally it is a combination of VOBU Groups from two or more distinct DVD encodes. The VOB follows the DVD specification constraints.

If one of these DVDs is pirated, either by a direct copy (so-called "ripping") or by re-encoding in, for example, the so-called DiVx or Xvid formats, it should be possible to identify the source of the pirate copy, i.e. the owner of the version form which the pirate copy was made. To do this, the video stream of the pirate copy is analysed. The segment boundaries are identified, and the identification data carried by the fingerprint in respect of each segment is decoded. This generates an identification vector which can be compared with the identification vectors stored in the database that was created when the discs were burned. Since each disc will have a quasi-unique identification vector, this should allow the identification of the source.

Figure 4:
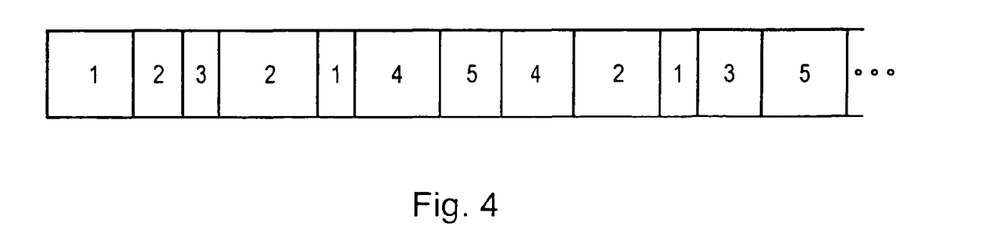
FIG. 4 schematically illustrates non-contiguous segments.

FIG. 4 schematically illustrates an arrangement using non-contiguous segments. Here, the segments are numbered 1, 2, 3, 4, 5 . . . and it can be seen that during the length of the video material (viewed from left to right across the page) each segment is split into two or more non-contiguous parts. The way in which this can help to defeat so-called collusion attacks will be discussed below.

The same concept may be used with, for example, internet downloads or video-on-demand arrangements, or other content delivery mechanisms where an individual content package is delivered to each user or group of users.

Figure 5:
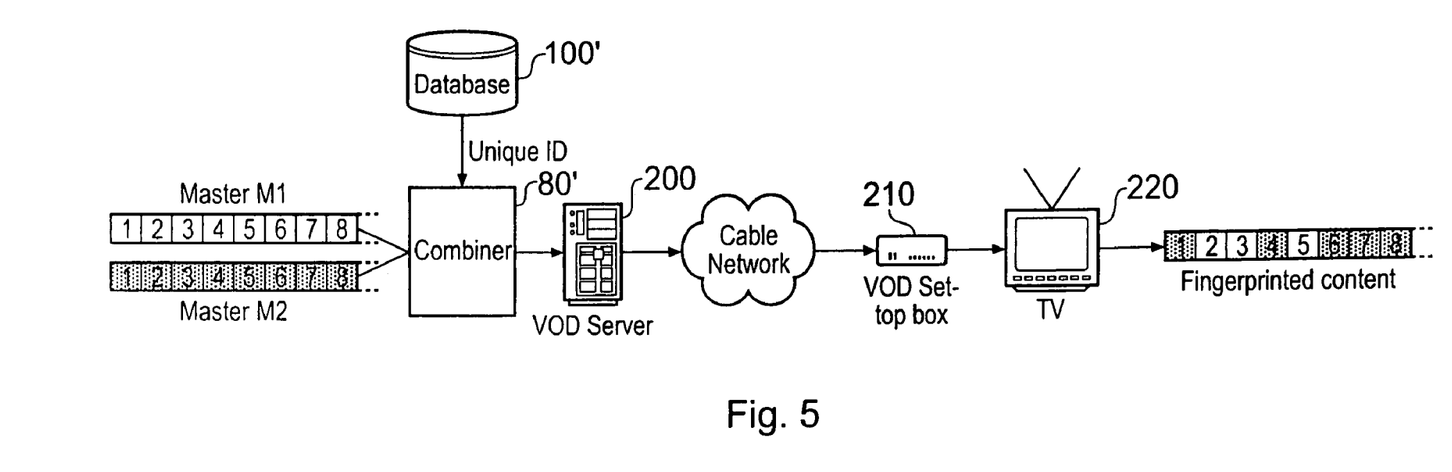
FIG. 5 schematically illustrates the application of the technique to a video-on-demand transmission.

FIG. 5 schematically illustrates the application of the technique to a video-on-demand (VOD) transmission. Here, two masters $M_1$, $M_2$ divided into segments (shown for simplicity as contiguous segments) are combined by a combiner 80' in accordance with an identification vector received from a database 100'. The combined video stream is handled by a VOD server 200 and transmitted by a cable network to a user's VOD set-top box 210. The user views the file on a television set 220.

Figure 6:
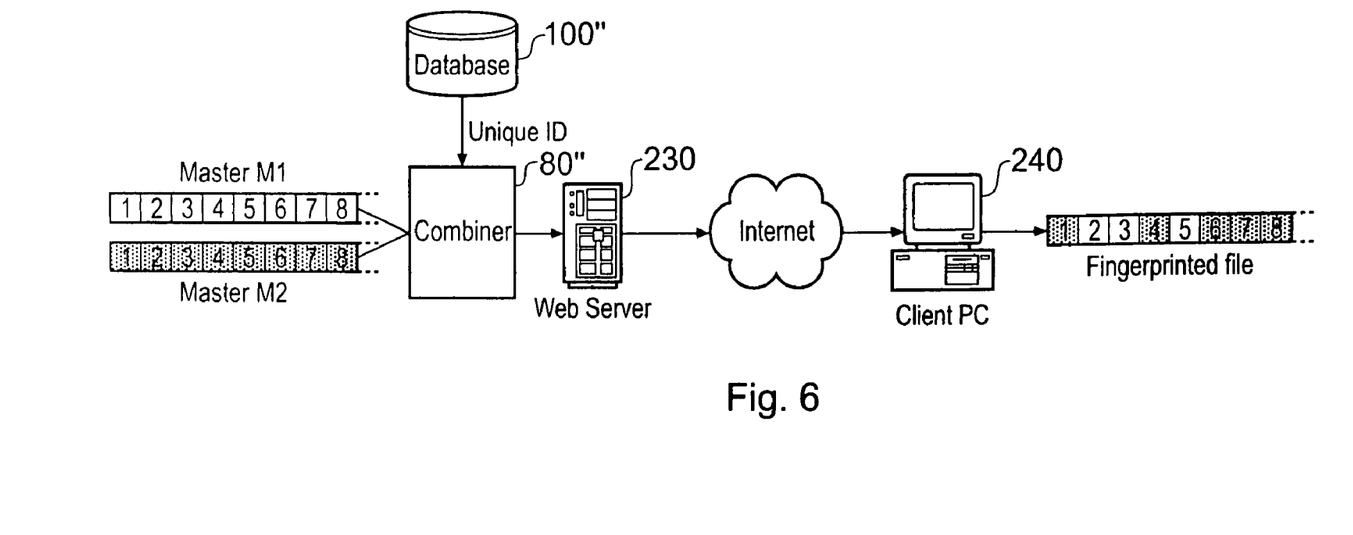
FIG. 6 schematically illustrates the application of the technique to an internet download file.

Similarly, in FIG. 6, a database 100" supplies an identification vector to a combiner 80" in order to combine two master copies $M_1$, $M_2$. The combined file is transmitted by a web server 230, over an internet connection and to a client personal computer (PC) 240.

It should be noted that as far as the VOD server and subsequent processing is concerned, and as far as the web server 230 and subsequent processing is concerned, the protected file is like any other file. The security obtained by combining fingerprinted masters has no relevance on the VOD server or the web server, nor on the end user's enjoyment of the content.

Despite the perceived robustness and low false positive rate of the underlying fingerprint technology, a segmentation system using the technology inappropriately could potentially have a higher false positive rate and little collusion robustness. At least some of these difficulties can be addressed by an appropriate decoding strategy.

Figure 7:
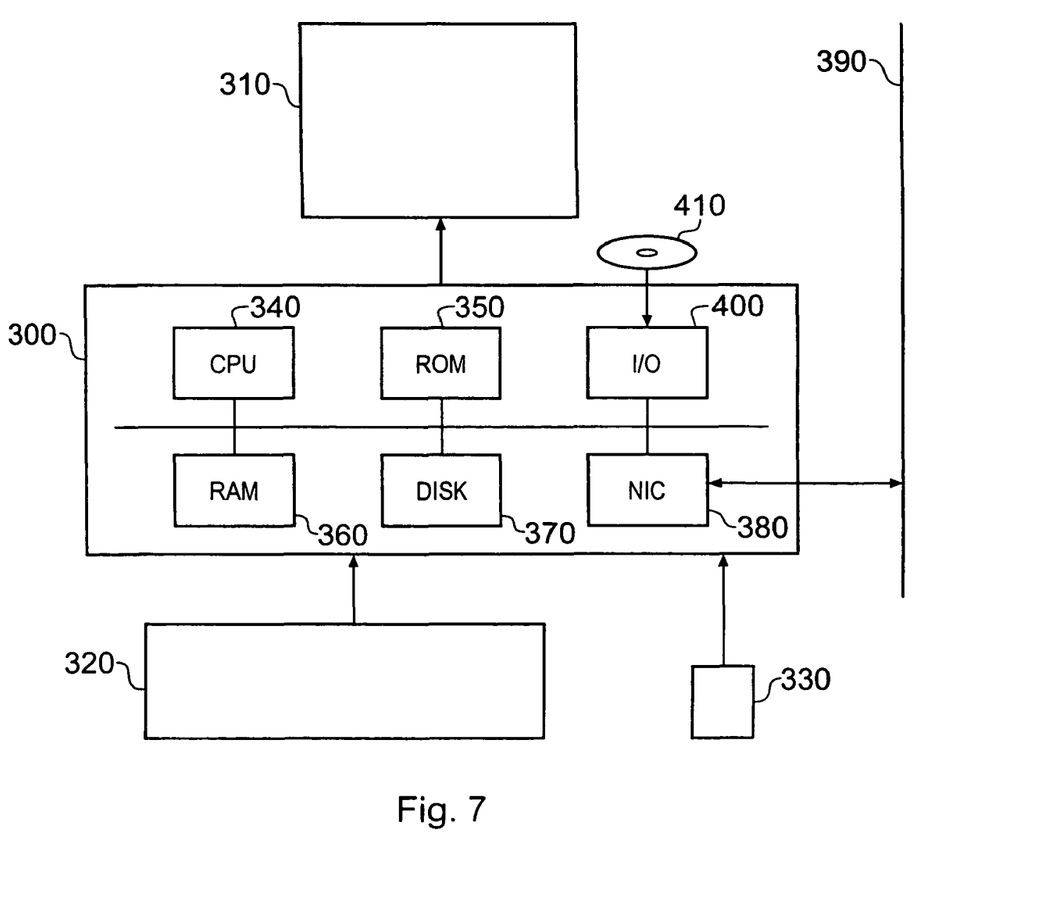
FIG. 7 schematically illustrates a fingerprint detection apparatus.

FIG. 7 schematically illustrates a fingerprint detection apparatus.

The apparatus of FIG. 7 comprises a personal computer 300 having a display 310, a keyboard 320 and a user input device such as a mouse 330. The personal computer has a central processing unit 340, read only memory 350, random access memory 360, disk storage 370, a network interface 380 by which a connection may be made to a network such as the internet 390 and input/output processing 400, for example set up to read and/or write data to/from a DVD disk 410. The software by which the personal computer implements the present techniques (and indeed the software controlling the version generation techniques described here) may be supplied on a storage medium such as the disk storage 370 or a removable medium such as the optical disk 410, and/or via a network or internet connection such as the connection via the network interface 380.

Figure 8:
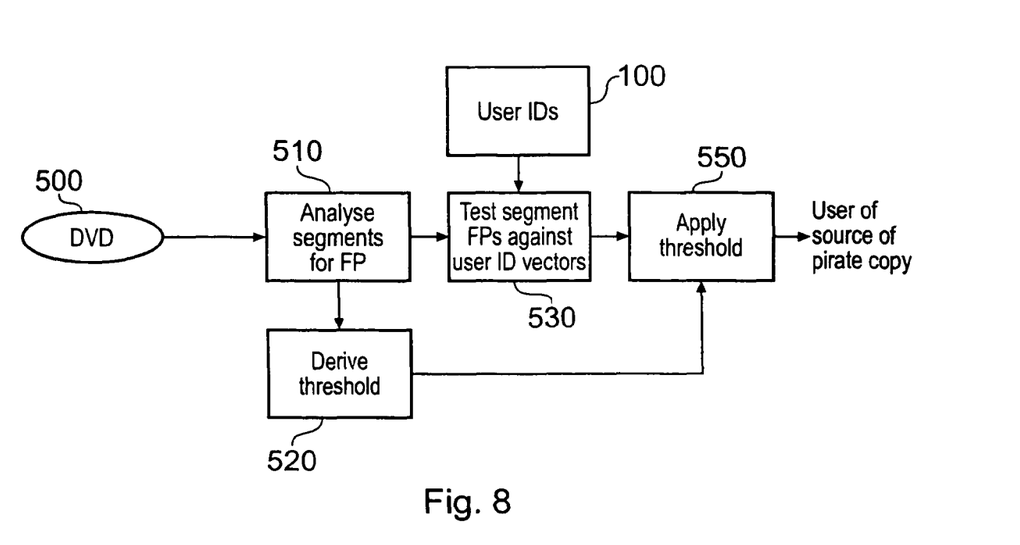
FIG. 8 schematically illustrates the operation of the apparatus of FIG. 7.

FIG. 8 schematically illustrates the operation of the apparatus of FIG. 7.

In FIG. 8, a suspect pirate copy of protected content is read from a DVD disk 500. At 510, the content is divided into segments in accordance with the predetermined (and secret) segmentation pattern and the segments are analysed for fingerprint data. At 520 a threshold amount is derived from this analysis. The way in which the threshold is derived will be described below, but in basic terms this is a statistical calculation in order to give a required or desired false positive rate (i.e. a required assurance that the end result is valid) given the distribution of identification data amongst the segments.

At 530, the segment identification data are tested against user identification vectors read from a copy of the database 100. Matching identification data are detected.

Finally, at 550, the threshold is applied to the results of the test carried out at 530. Any users whose identification vectors match sufficiently as to result in a test score which exceeds the threshold are considered to be sources of the pirate copy.

At a basic level, as mentioned above the decoder could decode identification data from each segment of the pirate copy to produce a decoded identification vector, and then attempt to match this decoded identification vector with the identification vector previously stored in respect of each user. However, in order to be robust against potential failure to decode identification data from a segment (e.g. if the content has been processed too severely or if the segment has been deleted from the content altogether), it is important that the decoder does not search for identification data match on every single segment. Instead, a good decoder strategy is to test for there being an identification data match on sufficiently many segments. Exactly what threshold number of matches is considered sufficient will depend on the desired false positive rate—if the threshold is too small then it is more likely that an innocent recipient's random identification vector will match the decoded identification vector sufficiently to indicate a match.

In the presence of collusion, it is possible that the underlying fingerprint decoder manages to decode multiple identification data for each segment (depending on how the collusion attack was performed).

In this situation a good decoding strategy is still to test for there being sufficiently many matches of a user's identification vector with the decoded identification vector. However, as noted, the decoded identification vector may have multiple identification data per segment. This fact increases the likelihood of an innocent user's pseudo-random identification vector happening to sufficiently match the decoded identification vector that the innocent user is deemed to be the source of the pirate copy. The threshold of matching segments should therefore be set to avoid this problem. Note that the threshold will actually depend on how many identification data are decoded per segment, which itself depends on how the collusion has been performed.

In the decoded identification vector, let the weight w of a segment be the number of information data decoded from that segment. Suppose there are m masters, then for each segment $0 \leq w \leq m$. Segments of weight 0 offer no information in a matching process, as no match is possible. Similarly, segments of weight m offer no information in a matching process, as a match is always possible.

A preferred decoding strategy is, for each recipient, to count the number of matches between the recipient's identification vector and the decoded identification vector, concentrating only on segments of weight $1 \leq w < m$. If the number of matches for a particular recipient's identification vector is greater than or equal to a threshold t, then that recipient can be accused of participating in the piracy. What follows is a method of calculating t to guarantee a specified false positive rate, p.

For $1 \leq w < m$, let $c_w$ be the number of segments of weight w in the decoded identification vector, i.e. the number of segments from which w identification data have been decoded.

Then $$l = \sum_{w=1}^{m-1} c_w$$

represents the total number of segments of weight $1 \leq w < m$.

For $1 \leq w < m$, let $B_w \sim Bin\left(c_w, \frac{w}{m}\right)$.

For any segment of weight w in the decoded identification vector, the probability of there being a match with the corresponding segment in an independent random identification vector is $$\frac{w}{m}.$$

As there are $c_w$ such segments in the decoded identification vector, $B_w$ represents the binomial probability distribution of the number of matches between the decoded identification vector and an independent random identification vector, when considering only segments of weight w.

For any random identification vector, (independent of the decoded identification vector), let A be a random variable that represents the number of matches between the random identification vector and the decoded identification vector, when considering only segments of weight $1 \leq w < m$ in the decoded identification vector. Then $$P(A = a) = \sum_{\substack{0 \leq b_1 \leq c_1 \\ 0 \leq b_2 \leq c_2 \\ \vdots \\ 0 \leq b_{m-1} \leq c_{m-1} \\ s.t.\ b_1 + b_2 + \cdots + b_{m-1} = a}} P(B_1 = b_1) P(B_2 = b_2) \cdots P(B_{m-1} = b_{m-1}).$$

If the population is of size y, then threshold t can be calculated as the smallest positive integer such that $$\sum_{a=t}^{l} P(A = a) \leq \frac{p}{y},$$

where the false positive rate is p.

Another possible algorithm will now be described.

It may be advantageous to associate more significance to a match with a segment of one weight as opposed to a match with a segment of another weight. It may therefore be desirable to have a weighted sum for calculating the number of matches. For $1 \leq w < m$, let $\alpha_w$ be a positive integer.

For any identification vector, V, let $c_{w,V}$ be the number of segments of weight w in the decoded identification vector that match the corresponding segment in V (for $1 \leq w < m$). Then let the weighted sum for calculating the number of matches be $$\sum_{w=1}^{m-1} \alpha_w c_{w,V}.$$

Note that this is equivalent to the previous strategy when $\alpha_w = 1$, for $1 \leq w < m$.

For any random identification vector, (independent of the decoded identification vector), let A be a random variable that represents the weighted sum of matches between the random identification vector and the decoded identification vector, when considering only segments of weight $1 \leq w < m$ in the decoded identification vector. Then $$P(A = a) = $$

$$\sum_{\substack{0 \leq b_1 \leq c_1 \\ 0 \leq b_2 \leq c_2 \\ \vdots \\ 0 \leq b_{m-1} \leq c_{m-1} \\ s.t.\ a_1 b_1 + a_2 b_2 + \cdots + a_{m-1} b_{m-1} = a}} P(B_1 = b_1) P(B_2 = b_2) \cdots P(B_{m-1} = b_{m-1}).$$

If the population is of size y, then threshold t can be calculated as the smallest positive integer such that $$\sum_{a=t}^{l} P(A = a) \leq \frac{p}{y},$$

where the false positive rate is p.

Tests have shown that using a weighted sum for the match count is sometimes slightly better and sometimes worse than using a non-weighted match count. It is, of course, possible to use a non-weighted and multiple weighted sums to perform many tests. In this case, the false positive rate, p, for each test must be reduced so that the overall combined false positive rate from all of the tests is low enough.

Empirical results have shown that a weighting of $$\alpha_w = \frac{m^2}{m - w + 1}$$

for $1 \leq w < m$ works well.

In the absence of collusion, the weighted and non-weighted decoding strategies are equivalent and work very well. For example, with (i) only 2 masters, (ii) 10000 recipients, (iii) 120 segments (e.g. 2-hour movie, 1 minute per segment), and (iv) a false positive of $10^{-8}$, it is possible to successfully detect the source of the pirate copy when only 40 of the segments yield segment identification data. With 4 masters, only 20 of the segments need to yield segment identification data in order for the source of the pirate copy to be determined.

Collusion, though, makes the situation much more tricky. It is difficult to determine the best collusion strategy that a set of colluders should adopt. Ignoring the collusion response of the underlying fingerprinting technology, one strategy for the colluders is to generate an identification vector with at most only one identification data per segment. If the segmentation pattern is known (or can be determined) then the colluders could form an attacked copy simply by selecting different segments from the copies they have available (e.g. if there are z colluders, then 1/z of the segments in the attacked version could come from each colluder).

It is therefore important that the attackers are not able to determine which portions of the movie constitute a segment. The encoding should preferably therefore be set up to (i) use a large number of segments and (ii) form each segment from smaller sections pseudorandomly distributed across the movie (as in FIG. 4, above). This should make it impossible or at least very difficult for the attackers to isolate individual segments, meaning that each segment will, in all likelihood, yield more than one segment identification data.

The colluders may, instead, choose the more conventional collusion attack of, say, averaging frames together. In such an approach, the collusion response of the underlying fingerprinting technology is important. For a given segment, the fingerprint detector will hopefully detect some or all of the segment identification data. Detecting the users who are the source of the pirate copy becomes easier as the number of segment identification data increases. However, it is possible that, given sufficiently many colluders, such an attack causes the detector to fail to detect any identification data over the period of a segment. It is therefore important that the segments are sufficiently long enough to survive the anticipated attacks (be it collusion or more general processing, such as compression, resizing, etc).

A balance must be made between (i) ensuring that a segment is sufficiently long to allow the fingerprint detector to detect segment identification data and (ii) ensuring that there are as many segments as possible to make the segmentation pattern as difficult to deduce as possible.

Reducing the population size can also help improve the decoding. Having generated a set of fingerprinted masters, the segment multiplexing can begin to produce the fingerprinted copies for distribution. Meanwhile, a new set of fingerprinted masters can be being generated as a background processes. Once this has been done, these masters could be used instead. This essentially reduces the population size for each set of masters. Alternately, the new masters could be used in addition to the old masters, thereby increasing the number of masters for future copies. This process will be described with reference to FIG. 10 below.

In the case that not every segment yields identification data, perhaps because of processing or camcorder piracy applied to the content, a technique will now be described using coalesced segments to attempt to derive identification data from those segments. Of course, this assumes that the segments were intended to carry identification data. It will be known from the segmentation pattern and the nature of the masters (i.e. was one master an un-fingerprinted file?) whether identification data is expected for each segment. This does point to an advantage of using all fingerprinted masters (rather than one unmarked fingerprinted master) because the expectation then is that every segment will carry some sort of identification data.

Figure 9:
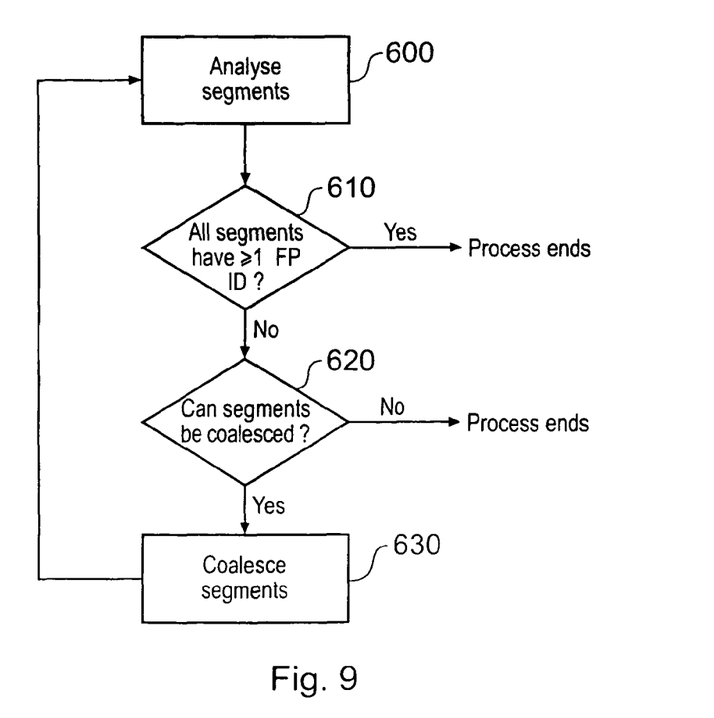
FIG. 9 schematically illustrates a segment analysis operation.

Referring to FIG. 9, at a step 600 the segments are analysed for identification data. At a step 610, a detection is made as to whether all segments have yielded at least one identification data. If this is true then the process (as regards analysing the segments) ends. If it is not true, control passes to a step 620.

At the step 620 a detection is made as to whether the segments for which identification data is expected but has not been obtained can be coalesced. Basically, this question could be considered as a detection of whether more than one segment has not yielded identification data as expected.

If the answer is no, i.e. there is only one such segment, then the process ends. If the answer is yes, then control passes to a step 630 at which the unsuccessfully decoded segments are coalesced.

The process of coalescing segments can take place in several stages. For example, if several segments were expected to carry identification data but have not yielded such identification data on decoding, then the segments could be combined in pairs in an arbitrary grouping (perhaps, temporally adjacent pairs of unsuccessfully decoded segments could be combined). In this case, if there is an odd number, one of the pairs could be made up to a group of three. Or a different rule could be applied, for example so that the unsuccessfully decoded segments are coalesced into groups of three and so on. The coalesced segments are then passes back to the step 600 for a repeated analysis to try to detect identification data.

Of course, it may be that the unsuccessfully decoded segments making up a coalesced segment all happen to carry the same identification data. In this case, coalescing the segments will mean that the decoder is more likely to detect the identification data. (In general, the longer a section of fingerprinted video material, the more likely it is that a decoder will detect the identification data). If the segments did not carry the same identification data, there is still a chance that coalescing them may assist in detection, or alternatively as the group of initial segments making up a coalesced segment grows, it becomes more likely that two or more of the initial segments would carry the same identification data.

So, after one stage of coalescing segments, if there are still two or more unsuccessfully decoded (coalesced) segments, a further stage of coalescing can take place. This can repeat in an iterative manner until only one unsuccessfully decoded coalesced segment remains.

Figure 10:
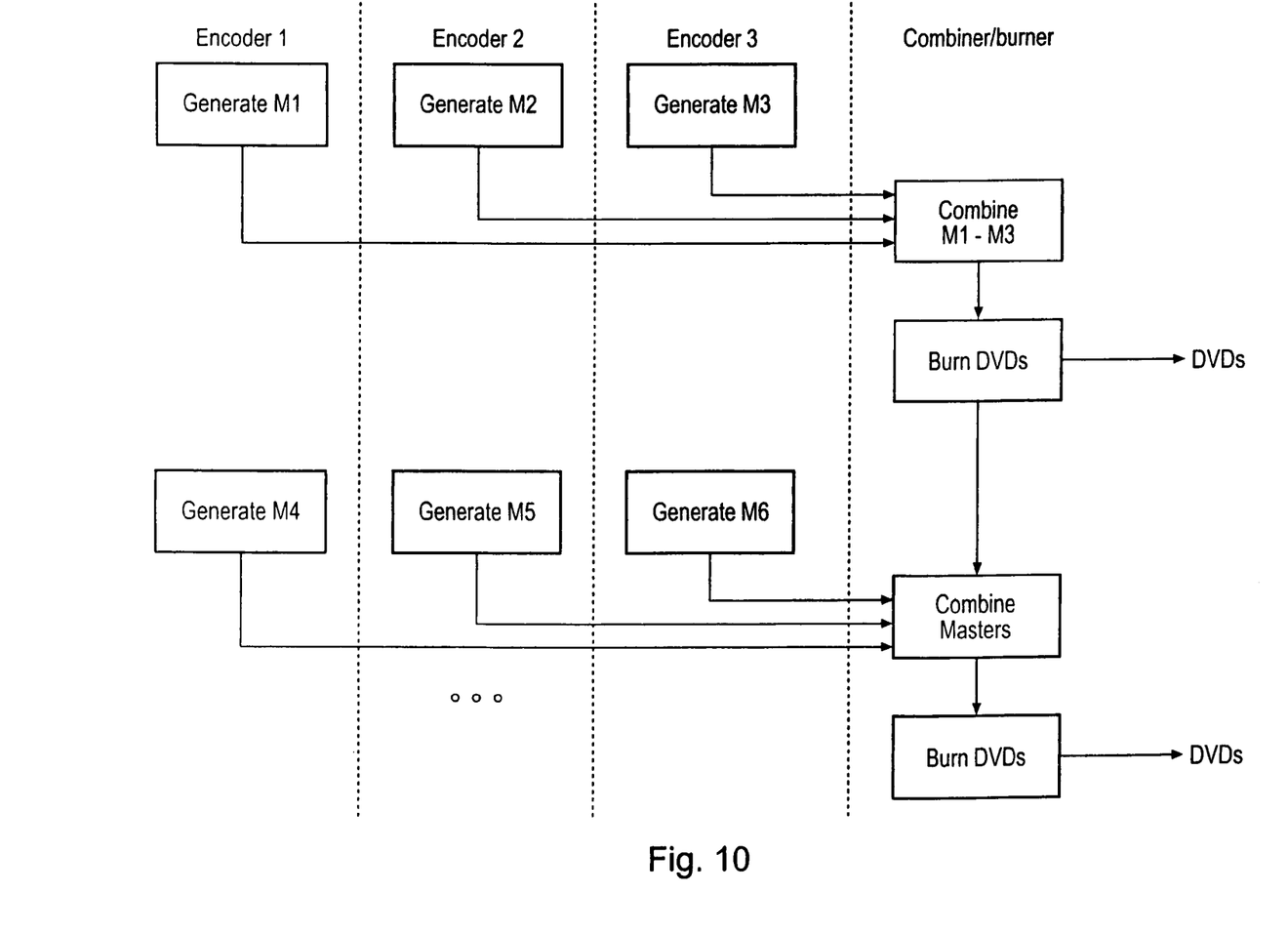
FIG. 10 schematically illustrates a master generation operation.

FIG. 10 schematically illustrates an alternative master generation operation. In this example, three parallel fingerprint encoders are used, referred to as encoders 1, 2 and 3. FIG. 10 is divided into four columns illustrating the operation of encoders 1, 2 and 3 in the left most three columns and the combiner/burner arrangement (80, 110 or 90, 120) in the right most columns.

At a first stage of encoding, the encoders generate three masters $M_1$, $M_2$, $M_3$. These are combined and DVDs are produced from the three masters.

Once the three masters have been produced, the encoders are then free to produce three further masters $M_4$, $M_5$, $M_6$. During the time that these further masters are being prepared, the DVDs that are produced by the combiner/burner will be based only on masters $M_1$ to $M_3$. However, once the further masters $M_4$ to $M_6$ are available, it is possible for the combiner/burner to produce versions based on

- only the masters $M_4$ to $M_6$
- all of the masters $M_1$ to $M_6$ or
- any permutation thereof.

The process can continue iteratively. In general, using current technology it is expected to take ten times as long to produce a fingerprinted master as to do the combination and writing of a single output version.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A method of detecting a version of data content which is input to a version detecting device having a processor, there being a plurality of different versions of said data content, each version being partitioned into two or more segments according to a segmentation time division pattern which is common to all versions of the data content and each version of the data content being identifiable by an identification data pattern, the identification data pattern being formed when the data content is generated by selecting a version of each segment from a set of n versions of said segment, where n is 2 or more, each version of said segment having different respective identification data, and the sequence of selection used for each different version of the data content forming a respective different identification data pattern, said method comprising:

detecting, using the version detecting device, respective identification data in a respective period of data content corresponding to each of the two or more segments of said data content;

comparing, using the version detecting device, said detected identification data with said identification data patterns corresponding to said different versions of said data content;

detecting, using the version detecting device, any matches obtained between said detected identification data and said identification data patterns in a period of data content of a segment;

calculating, using the version detecting device, a threshold number in dependence upon how many matches are detected per segment for the two or more segments of said data content; and detecting, using the version detecting device, that said data content comprises at least a contribution from a certain version of said data content when a total sum of matches obtained between said detected identification data and said identification data pattern for said certain version exceeds said threshold number.

2. The method according to claim 1, comprising the step of deriving said threshold number from said identification data detected in respect of said segments of said data content.

3. The method according to claim 1, in which said threshold number is set so that a statistical chance of said data content being incorrectly detected as a certain version, given how many instances of said identification data are detected in respect of each of said segments of said data content, is less than a threshold probability.

4. The method according to claim 1, comprising the step of: weighting a match between said identification data detected in respect of one of said segments of said data content according to how many instances of said identification data are detected in respect of that segment of said data content, said sum of matches being a weighted sum of matches.

5. The method according to claim 4, in which said step of weighting is such that a segment for which plural instances of said identification data are detected contributes more to said weighted sum of matches than a segment for which a single instance of said identification data is detected.

6. The method according to claim 4, in which said step of weighting is such that a segment for which plural instances of said identification data are detected contributes less to said weighted sum of matches than a segment for which a single instance of said identification data is detected.

7. The method according to claim 1, comprising the step of: if said identification data is not detected in respect of two or more of said segments of said data content, combining those segments into groups of two or more of said segments and detecting said identification data in respect of said combined groups of said segments.

8. The method according to claim 7, comprising the step of: if said identification data is not detected in respect of two or more of said groups of said segments of said data content, iteratively combining said groups of said segments into larger groups of said segments and detecting said identification data in respect of said combined groups of said segments.

9. The method according to claim 1, in which said threshold number represents a number of said segments less than the total number of said segments.

10. The method according claim 9, in which said threshold number represents a number of said segments less than the total number of said segments having said respective identification data according to one of said identification data patterns.

11. The method according to claim 1, in which said versions of said data content are identifiable by said corresponding identification patterns by which substantially all of said segments have said respective identification data.

12. The method according to claim 1, in which said data content comprises video content having a plurality of successive images.

13. The method according to claim 12, in which said identification data is encoded within said data representing at least some of said images.

14. The method according to claim 13, in which said identification data is encoded within a subset of spatial frequency components of at least some of said images.

15. A non-transitory computer readable medium having stored thereon program code for carrying out the method according to claim 1.

16. A version detection apparatus for detecting a version of data content which is input, there being a plurality of different versions of said data content, each version being partitioned into two or more segments according to a segmentation time division pattern which is common to all versions of the data content and each version of the data content being identifiable by an identification data pattern, the identification data pattern being formed when the data content is generated by selecting a version of each segment from a set of n versions of said segment, where n is 2 or more, each version of said segment having different respective identification data, and the sequence of selection used for each different version of the data content forming a respective different identification data pattern, said apparatus comprising: a processor configured to execute: an identification data detector
configured to detect respective identification data in a respective period of data content corresponding to each of the two or more segments of said data content;
a comparator configured to compare said detected identification data with said identification data patterns corresponding to said different versions of said data content;
a detector configured to detect any matches obtained between said detected identification data and said identification data patterns in a period of data content of a segment;
a calculator configured to calculate a threshold number in dependence upon how many matches are detected per segment for the two or more segments of said data content; and
a contribution detector configured to detect that said data content comprises at least a contribution from a certain version of said data content when a total sum of matches obtained between said detected identification data and said identification data pattern for said certain version exceeds said threshold number.

* * * * *